United States Patent [19]

Hatta et al.

[11] 3,754,218

[45] Aug. 21, 1973

[54] DATA HANDLING SYSTEM WITH RELOCATION CAPABILITY COMPRISING OPERAND REGISTERS ADAPTED THEREFOR

[75] Inventors: Hiroshi Hatta; Yoshiteru Ishii, both of Tokyo, Japan

[73] Assignee: Nippon Electric Company, Limited, Tokyo, Japan

[22] Filed: May 27, 1971

[21] Appl. No.: 147,318

[30] Foreign Application Priority Data

May 29, 1970 Japan ............................... 45/45589

[52] U.S. Cl. ............................................. 340/172.5

[51] Int. Cl. ............................................. G06f 9/20

[58] Field of Search ................................. 340/172.5

[56] References Cited

UNITED STATES PATENTS

| | | | |
|---|---|---|---|
| 3,548,384 | 12/1970 | Barton et al. | 340/172.5 |
| 3,510,847 | 5/1970 | Carlson et al. | 340/172.5 |
| 3,487,370 | 12/1969 | Goshorn et al. | 340/172.5 |
| 3,482,213 | 12/1969 | Bennett et al. | 340/172.5 |
| 3,412,382 | 11/1968 | Couleur et al. | 340/172.5 |

*Primary Examiner*—Paul J. Henon
*Assistant Examiner*—John P. Vandenburg
*Attorney*—Sandoe, Hopgood and Calimafde

[57] ABSTRACT

Each operand register for a data handling system is provided with a first area, a second area, and a third area. The first area is loaded with information for identifying whether datum with which the register is loaded is an address datum or an operand quantity other than address data. The second area may be loaded with a base register number. The third area may be loaded with an effective address, i.e., the sum of the base address and the index-modified relative address.

7 Claims, 4 Drawing Figures

*INVENTORS*
HIROSHI HATTA
YOSHITERU ISHII

*by*
Sandoe, Hopgood & Calimafde
ATTORNEYS

DATA HANDLING SYSTEM WITH RELOCATION CAPABILITY COMPRISING OPERAND REGISTERS ADAPTED THEREFOR

BACKGROUND OF THE INVENTION

This invention relates to data processing and, more specifically, to a data handling system having a relocation capability.

The main memory for a digital computer or a like data handling system is expensive. From an economic standpoint, the main memory does not posses sufficient memory capacity to store all programs and data for the data handling system. It has therefore become important with the rise of computer utilization levels to increase the efficiency of the main memory by storing therein only those programs and that data which is indispensable for present purposes. Other programs and data quantities are retained in less expensive external memories, such as magnetic drums and/or the magnetic tapes. Programs and data which become necessary are transferred from the external memories to the main memory, while reversely transferring to peripheral storage those digital words which become less frequently employed.

With the recent further development of the data handling art, it has become the norm to furnish a data handling system with the capability of interrupting the program which has been stored in the main memory and is being executed, moving the program and the data associated therewith to another location. The interrupted program is restarted at a later time the interrupted program and the data therefor being moved back into the main memory. Between the interruption and the restart, the program and the data may either be moved within the main memory, or moved to the external memory and re-stored in the main memory at different location. The operations of interrupting the program and later restarting the same are called "relocation."

One of the problems accompanying relocation is how to modify the address data contained in the relocated program. For example, the content of the address part of an instruction word must be modified in accordance with the relocation of the instruction word and the data concerned with the instruction. The modification is time consuming if it must be carried out each time relocation is effected, and for all instruction words concerned with relocation.

Several systems have been proposed to reduce the amount of address modification required. One is the base register system wherein the address part of each instruction word contains datum (digital information) for specifying the base register, and datum representing a displacement, i.e., a relative address with reference to the address (the base address) contained in the specified base register. The effective address for the main memory is thus completely specificed, and comprises the sum of the base address contained in the base register and the displacement contained in the instruction word. With this system, it may appear sufficient to modify the content of only the base register in accordance with relocation because the modified base address gives the modified effective addresses when the respective displacements are added thereto. It is, however, often necessary to handle the address datum (the absolute address) like other operands, by loading an operand register with the sum of the base addres plus the displacement. These address data words must be modified in accordance with any relocation. Such modification must be effected only after the content of the operand register in question is identified to be an address word. Furthermore, each of these addresses may be stored in the main memory at a certain address. It is difficult to find out the address in the main memory at which the address datum is stored. Storing of the address data in the main memory occurs frequently, because the data is transferred from the operand registers to the main memory each time the operation of a program is shifted to a subroutine to make it possible to restart the former program after the subroutine is carried out.

SUMMARY OF THE INVENTION

It is therefore an object of this invention to provide a data handling system with a relocatability capability which does not require any troublesome operation for a relocation.

It is another object to provide a data handling system of the type wherein address data contained in operand registers is easily identified and modified on relocation.

It is still another object to provide a data handling system of the type wherein address data stored in a main memory need not be modified on relocation.

According to this invention, each operand register for the data handling system is provided with a first area and a second area. The first area is loaded with information for identifying whether the datum with which the register is loaded is an address or an operand other than an address. When an address datum is placed in the operand register, the second area is loaded with the information for identifying the source from which the datum is derived. The latter information may be a base register number. The operand register may further be provided with a third area in which the effective address is placed when the register is loaded with an address datum. The effective address is given by the sum of the base address contained within the base register whose number is stored in the second address area and the displacement, or the relative address, contained in the instruction word. When the index information is contained in the instruction word, it should be understood that "the relative address" means the index-modified relative address which is given as the sum of the displacement and the content of the index register specified by the index information.

According to an aspect of this invention, the main memory is provided, at each address, with a first area and a second area. The first area is for storing the above-mentioned information for identification. When an address is stored at the address, the second area is used to store an index to the base address. The index may be the base register number. The main memory may further be provided with a third area in which the relative address is stored when an address datum is stored at the address.

In either case, the first area may be the No. 0 bit position and may be provided with a logic "1" amd "0" data to identify address datum and any other operand, respectively.

Since the content of each operand register is provided with information for discriminating between address data and other operand quantities, the address data placed in the operand registers are readily and quickly identified for modification upon any relocation by the program. In addition, each of the address parts of the instruction words and the address data stored in the main memory by the programs may be given by the base register number and the relative address independently of the absolute address. As a result of relocation, the programs and the data are preferably subjected to translation, that is moved to another location in the main memory without changing the relative relation therebetween. It is then possible to make the data handling system operate properly in compliance with the restarted program without any modification to the address parts of the instruction words and to the address data stored in the main memory, by merely changing the base address in accordance with the amount of translation. Since as the contents of the operand registers are stored by store instructions in the main memory prior to translation, modification to the address data in the operand registers is automatically carried out by only changing the base address by a specific instruction and by transferring the address data from the main memory to the operand registers by load instructions.

DESCRIPTION OF THE PREFERRED EMBODIMENTS

Figure 1:
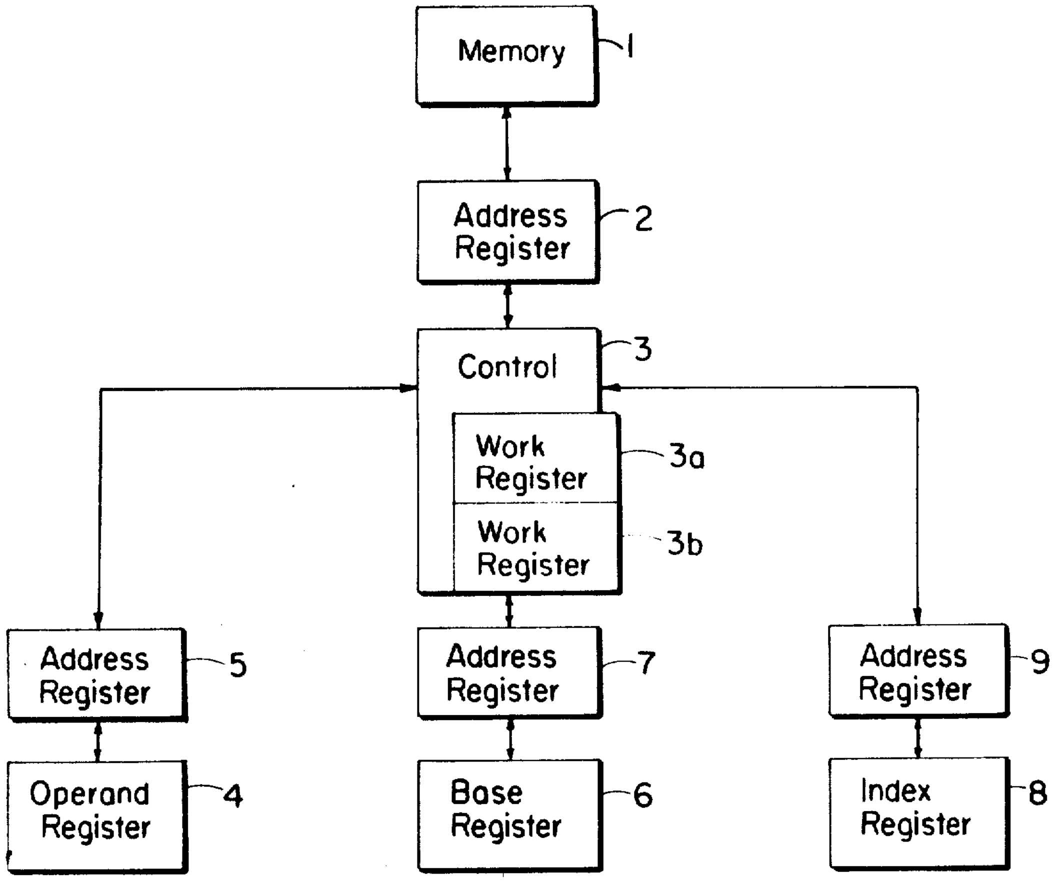
FIG. 1 is a schematic block diagram of a data handling system illustrating the principles of the present invention.
Figure 2:
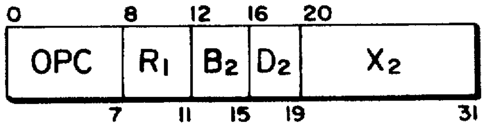
FIG. 2 illustrates the format of an instruction word which is suitable for implementing the present invention.

Referring to FIG. 1, a data handling system in accordance with the present invention comprises a main memory 1, an address register 2 therefor, a control unit 3 having at least a first and a second work register 3*a* and 3*b*, operand registers 4 and, an address register 5 therefor, base registers 6 and, an address register 7 therefor, and index registers 8 and an address register 9 therefor. The control unit 3 reads out the instruction words from the main memory 1 through the address register 2. As shown in FIG. 2, an instruction word has an operation code area OPC for specifying the operation to be carried out by the instruction, an operand register area $R_1$ for specifying an operand register 4, a base register area $B_2$ for specifying a base register 6, a displacement area $D_2$ giving the displacement, and an index register area $X_2$ for specifying an index register 8. These areas may have eight, four, four, four, and 12 bit positions, respectively. The areas represented by the legends having suffixes are the address part of the instruction word. The areas identified by the legends with the suffix "2" give the address of an operand.

Figure 3:
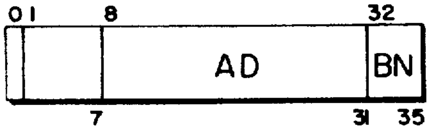
FIG. 3 shows the construction of an operand register according to this invention.

According to one aspect of this invention, each operand register 4 has a first area (No. 0 bit position), a second area (No. 1 through No. 7 bit positions), a third area (No. 8 through No. 31 bit positions), and a fourth area (No. 32 through No. 35 bit positions) depicted in FIG. 3. The first area is for the information for determining whether the datum with which the register 4 is loaded is an address or an operand other than an address. The second through the third area are for the datum of an operand other than address data. The third area is for the datum giving an effective address AD. The fourth area is for a base register number BN of the base register 6 giving the base address for the address datum with which the register 4 is loaded. When the register 4 is loaded with an address datum and a different operand, the second and the fourth areas are not used, respectively.

Figure 4:
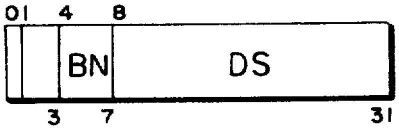
FIG. 4 shows the construction of the main memroy at an address according to this invention.

As illustrated in FIG. 4, the main memory 1 has, at each address, a first area (No. 0 bit position), a second area (No. 1 through No. 3 bit positions), a third area (No. 4 through 7 bit positions), and a fourth area (No. 8 through No. 31 bit positions). The first area is for the information for determining whether the datum stored in the address is an address or a datum other than the address data. The second through the fourth areas are for the datum other than the address data. The second area is not used when an address datum is stored at the address. For a stored address word the third and the fourth areas are for the base register number BN and the relative address DS, respectively.

Operation of the data handling system exemplified and described above will be described hereinbelow under the respective functional topic headings.

LOAD ADDRESS INSTRUCTION

In accordance with the instruction, an operand register 4 specified by the operand register area $R_1$ is loaded with address datum given by the load address instruction word at the base register, the displacement, and the index register areas $B_2D_2$, and $X_2$ of the instruction. More particularly, the control unit 3 transfers the content of the base register 6 specified by the area $B_2$ to the first work register 3*a*, adds the displacement given by the area $D_2$ to the content of the first work register 3*a* and, further, adds, when the control unit 3 finds index modification necessary by decoding the information contained in the area $X_2$, the contents of the index register 8 specified by the area $X_2$. The control unit 3 causes the third area of the operand register 4 specified by the area $R_1$ to be loaded with the resulting stored content of the first work register 3*a*, which is the effective address AD for the address defined by the areas $B_2$, $D_2$, and $X_2$. The addition may be conducted in the operand register 4 specified by the area $R_1$ rather than in the first work register 3*a*. The control unit 3 further acts to put a logic "1" and the base register number BN given by the area $B_2$ in the first and the fourth areas, respectively, as soon as the operand register 4 is loaded with the effective address.

It is observed that, the control unit 3 effects no change to the data in the first and the fourth areas of the operand register 4 previously loaded with an address when the register 4 is reloaded with another address datum having the same base address as the former address datum.

STORE INSTRUCTION

The content of the operand register 4 specified by the operand register area $R_1$ is stored in the main memory 1 at an address given by the store instruction word at the base register, the displacement, and the index register areas $B_2$, $D_2$, and $X_2$. More particularly, the control unit 3 reads the contents of the operand register 4 specified by the area $R_1$ and makes a decision based upon the digital value of No. 0 bit of the read information.

If the bit is a logic "0," the control unit 3 stores the No. 0 through No. 31 bits of the read information in the main memory 1 at the address specified by the areas $B_2$, $D_2$, and $X_2$ of the store instruction word, neglecting the No. 32 through No. 35 bits of the read information. If the No. 0 bit is a logic "1," the unit 3 puts a logic "1" datum in the main memory 1 at the No. 0 bit position of the address specified by the areas $B_2$, $D_2$, and $X_2$ of the store instruction word, transfers the base register number BN from the No. 32 through No. 35 bit positions of the operand register 4 specified by the area $R_1$ to the third area of the address, subtracts the content of the base register 6 specified by the base register number BN from the effective address AD read from the operand register 4 to derive the relative address DS, and places the relative address DS in the fourth area of the address, neglecting the second area of the operand register 4.

LOAD INSTRUCTION

The operand register 4 specified by the operand register area $R_1$ is loaded with the datum stored in the main memory 1 at the address defined by the stored contents of the areas $B_2$, $D_2$, and $X_2$. Like the load address instruction, the control unit 3 derives the sum of the decoded contents of the areas $B_2$, $D_2$and $X_2$ of the load instruction word to give the address of the datum sought in the main memory 1. The control unit 3 again branches depending upon the binary value of the No. 0 bit of the datum read out of the main memory 1.

If the bit is a logic "0," the control unit 3 transfers the datum to the No. 0 through No. 31 bit positions of operand register 4 specified by the area $R_1$ of the load instruction word, without affecting the No. 32 through No. 35 bit positions of the operand register 4. If the bit is a logic "1," the control unit 3 transfers the datum to the first work register 3*a*, extracts the base register number BN from the datum, selects the base register 6 in accordance with the base register number BN, transfers the base address from the base register 6 to the second work register 3*b*, loads the operand register 4 with the sum of the datum contained in the first work register 3*a* at the less significant 24 bit positions and the datum contained in the second work register 3*b* at the No. 1 through No. 31 bit positions, puts a logic "1" digit in the first area of the operand register 4, and puts the base register number BN in the fourth area.

RELOCATION

It is not assumed that the control unit 3 has determined with reference to a monitor program that the program in progress i.e., then being executed, is to be relocated and that a temporary storage area is available in the main memory 1 for the data placed in the operand registers 4. The control unit 3 interrupts further execution of the program, executes a store instruction for storing the datum in each operand register 4 in the temporary store area, and moves the program and the data within the main memory 1. When the datum to be transferred by the store instruction to the temporary area is address information, the control unit 3 stores the elemental data for the effective address AD in the temporary area in the manner described in conjunction with the store instruction. Depending upon the specific circumstances, the program and the data may be tranSFERRED to an external memory, from which they are re-stored in the main memory 1 upon restarting the program. The re-storing may be effected at a location shifted from the former location. Thus, the program and the data are moved within the main memory 1 in effect. Following such transfer of the program and the data, the control unit 3 increases or decreases the content of the base register 6 by an amount equal to the difference in the adresses before and after the translation of the program and the data within the main memory 1. The control unit 3 now executes a load instruction for transferring each datum from the temporary store area to the operand register 4, to complete relocation.

It is to be understood that the above described arrangement is merely illustrative of the principles of the present invention. Numerous modifications and adaptations thereof will be readily apparent to those skilled in the art, without departing from the spirit and socpe of the present invention.

We claim:

1. A data handling system with relocation capability including a plurality of base registers for storing base addresses, a plurality of operand registers, and a main memory having a plurality of storage addresses, a subgroup of said storage addresses being identified by one base address and a plurality of relative addresses contained in one of said base registers and a group of instructions for the data handling system, respectively, each of said operand registers and said storage addresses in said main memroy including means for storing either an address datum and a datum other than the address data, wherein the improvement comprises a first, a second, and a third storage area included in each of said operand registers and said storage addresses in said main memory, said first storage area comprising means for storing first and second information for identifying whether the operand register or storage address has an address datum or a datum other than an address data stored therein, said second storge area comprising means for storing a code specifying one of said base registers that contains a base address for address datum stored in said operand register or main memory address, said third storage area of the operand register comprising means for storing a resulting address given by the sum of the base address and a relative address when the operand register contains an address datum, said third area of said storage address being, when the datum stored in the main memory at the address is an address datum, a relative address therefor.

2. A data handling system as in claim 1, further including a control unit comprising first means responsive to the information contained in said first area of one of said operand registers and said storage addresses for discriminating between said first and said second information.

3. A data handling system as in claim 2, wherein said system includes load address instructions, store instructions, and load instructions, each of said instructions including a first code specifying one of said operand registers, a second code specifying one of said base registers, and a third code comprising a relative address, said control unit further comprising second means operatively coupled to said base registers and comprising means responsive to each of said instructions for extracting the base address from the base register specified by the second code, means for adding the relative address specified by the third code to the base so extracted to derive a resulting address, and means for retaining said resulting address.

4. A system as in claim 3 wherein said control unit further comprises means for storing said first or said second information in said first sotrage area of said operand registers and said main memory responsive to the type of datum being stored therein.

5. A system as in claim 4 wherein said control unit further comprises means responsive to a load address instruction for supplying the second code to the second area of an operand register specified by said first code and for storing said resulting address in said third storage area of said selected operand register.

6. A system as in claim 5 wherein said control unit further comprises means responsive to a store instruction for modifying said resulting address with the contents of a base register, and for storing the resulting relative address in the third storage area of an address in main memory given by said instruction responsive to the operand register identified by said first code containing address data as signaled by the first storage area thereof.

7. A system as in claim 5 wherein said control unit further comprises means responsive to a load instruction for storing, in the operand register specified by the first code thereof, the contents of a main memory address given by said resulting address.

* * * * *